US012654323B2

(12) United States Patent
Abello Rosello et al.

(10) Patent No.:    US 12,654,323 B2
(45) Date of Patent:        Jun. 16, 2026

(54) SURFACE MARKING ROBOTS AND OBSTACLES

(71) Applicant: Hewlett-Packard Development Company, L.P., Spring, TX (US)

(72) Inventors: Lluis Abello Rosello, Sant Cugat del Valles (ES); Ramon Viedma Ponce, Sant Cugat de Valles (ES); Borja Navas Sanchez, Sant Cugat del Valles (ES); Xavier Oliva Ventayol, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 78 days.

(21) Appl. No.: 18/720,360

(22) PCT Filed: Dec. 16, 2021

(86) PCT No.: PCT/US2021/063752
§ 371 (c)(1),
(2) Date: Jun. 14, 2024

(87) PCT Pub. No.: WO2023/113799
PCT Pub. Date: Jun. 22, 2023

(65) Prior Publication Data
US 2024/0335946 A1      Oct. 10, 2024

(51) Int. Cl.
B25J 9/16          (2006.01)
E01C 23/22        (2006.01)
(Continued)

(52) U.S. Cl.
CPC ........... B25J 9/1666 (2013.01); B25J 9/1661 (2013.01); G05D 1/249 (2024.01); E01C 23/163 (2013.01);
(Continued)

(58) Field of Classification Search
CPC ........ B25J 9/1666; B25J 9/1661; B25J 9/161; E01C 23/222; E01C 23/163; G05D 1/225;
(Continued)

(56) References Cited

U.S. PATENT DOCUMENTS

| 5,755,072 A | * | 5/1998 | Lingafelter | ............. | E04G 21/18 |
| | | | | | 52/741.1 |
| 8,699,756 B2 | | 4/2014 | Jensen | | |

(Continued)

FOREIGN PATENT DOCUMENTS

| CN | 1784685 A | 6/2006 |
| CN | 109195751 A | 1/2019 |

(Continued)

OTHER PUBLICATIONS

Osman, H M., et al., "A hybrid CAD-based construction site layout planning system using genetic algorithms.", Automation in construction, vol. 12, No. 6, 2003, pp. 749-764.
Qin, Z., et al., "Workpiece localization with shadow detection and removing.", Proceeding of the IEEE International Conference on Robotics and Biomimetics, Dec. 2013, pp. 2727-2731.

*Primary Examiner* — Abby Lin
*Assistant Examiner* — Karston G. Evans
(74) *Attorney, Agent, or Firm* — Jordan IP Law, LLC

(57)                ABSTRACT

In an example, a method comprises receiving a digital representation of a floor plan to be printed by a surface marking robot guided using a remote guiding system, receiving guiding system position information, and receiving obstacle information identifying an obstacle. The method also comprises identifying a specific floor plan feature of the digital representation which intersects a shadow region of the obstacle from a guiding system point of view, and, in response to this, modifying the digital representation to produce a second digital representation, whereby the specific floor plan feature is either deleted or modified in the second digital representation, the modified
(Continued)

floor plan feature excluding at least a portion of the specific floor plan feature in the shadow region. The method also comprises operating the surface marking robot to print the second digital representation using the guiding system.

14 Claims, 6 Drawing Sheets

(51) Int. Cl.
  *G05D 1/249*     (2024.01)
  *E01C 23/16*     (2006.01)
  *G05D 105/00*    (2024.01)

(52) U.S. Cl.
  CPC ........ *E01C 23/222* (2013.01); *G05D 2105/17* (2024.01)

(58) Field of Classification Search
  CPC .... G05D 1/249; G05D 1/622; G05D 2105/17; G05D 2107/90; G05D 2109/10; G05D 1/247; B25H 7/04
  See application file for complete search history.

(56)                References Cited

U.S. PATENT DOCUMENTS

| 2007/0059098 | A1* | 3/2007 | Mayfield ................. A63C 19/06 |
| | | | 404/84.5 |
| 2007/0100496 | A1 | 5/2007 | Forell |
| 2016/0165795 | A1* | 6/2016 | Balutis ................. G05D 1/0044 |
| | | | 701/25 |
| 2019/0163175 | A1 | 5/2019 | Ko et al. |
| 2020/0125103 | A1* | 4/2020 | Li ........................... A47L 11/24 |
| 2020/0338580 | A1 | 10/2020 | Herget et al. |
| 2022/0317693 | A1 | 10/2022 | Kleiner et al. |
| 2023/0266772 | A1* | 8/2023 | Herget ................. G05D 1/0276 |
| | | | 701/24 |

FOREIGN PATENT DOCUMENTS

| JP | 2003-228601 | A | 8/2003 |
| JP | 2004-302756 | A | 10/2004 |
| JP | 2021-011772 | A | 2/2021 |
| WO | 2020/244414 | A1 | 12/2020 |

* cited by examiner

300

101

102

303

104

Receiving

Identifying

Modifying

Operating

SURFACE MARKING ROBOTS AND OBSTACLES

BACKGROUND

Surface marking robots may be used to draw or print lines on a surface by depositing printing material while moving.

BRIEF DESCRIPTION OF THE DRAWINGS

Non-limiting examples will now be described with reference to the accompanying drawings, in which.

DETAILED DESCRIPTION

Surface marking robots may be, for example, autonomous vehicles which may be used for printing images such as lines on surfaces for applications such as construction and street marking. In order for a surface marking robot to move across such surfaces with precision, a surface marking robot may be guided using a guiding system remote from the robot, such guiding system acting as a reference point for the robot, the robot and the guiding system communicating using electromagnetic radiation. The communication between the robot and the remote guiding system may however be submitted to interferences, for example due to obstacles located between the robot and the guiding system, such obstacles impacting the transmission of the electromagnetic radiation between the robot and the guiding system when the robot is located in a shadow region generated by the obstacle from the guiding system point of view. Such interferences may impact robot navigation capabilities and lead to errors in the marking of the surface. Such interferences may require the intervention of an operator. Introducing capabilities to take such interferences into account and avoid or reduce errors in marking forms the foundation of the present disclosure.

Figure 1:
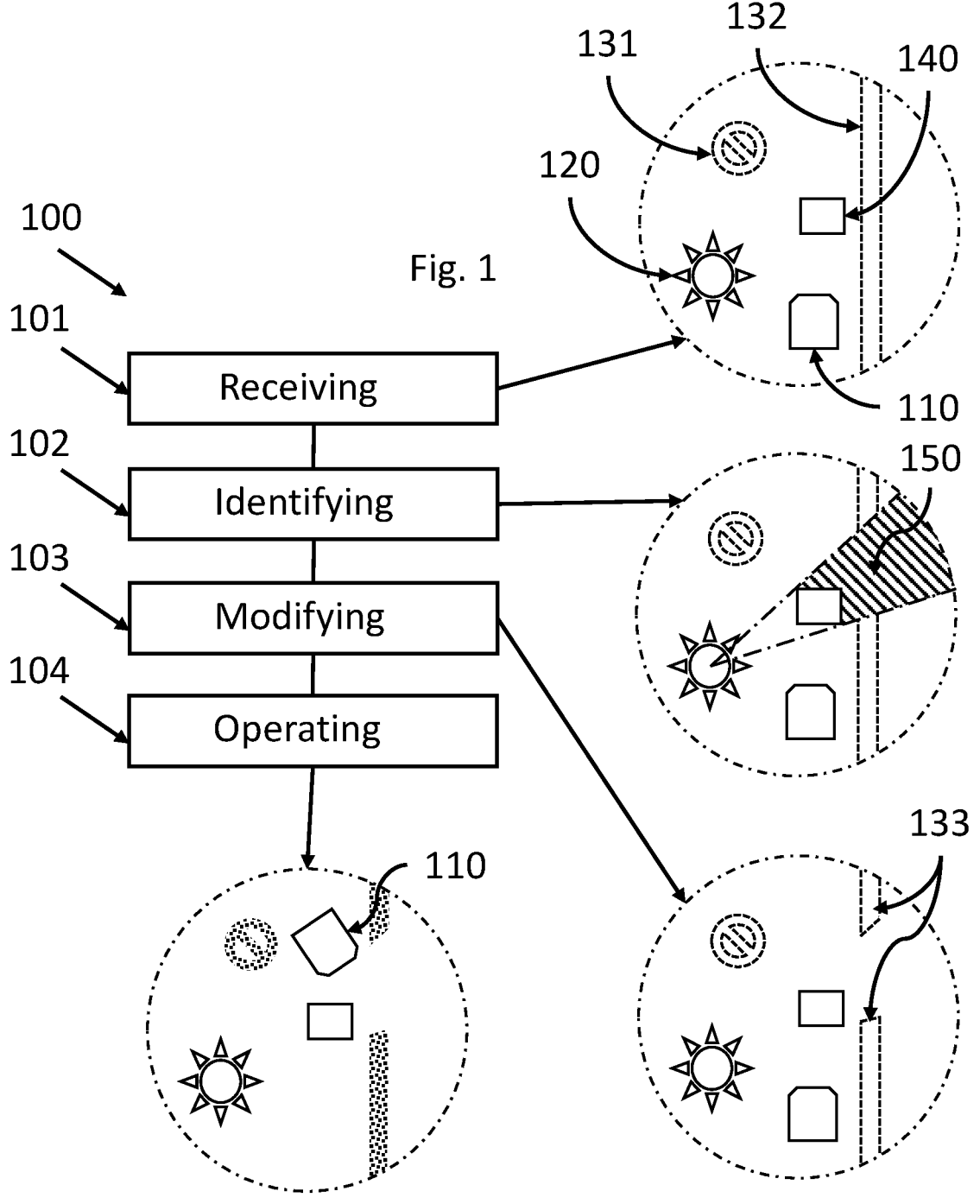
FIG. 1 shows a schematic flow chart of an example method.

FIG. 1 illustrates an example method 100 of operating a surface marking robot 110. This figure and other figures in this disclosure comprise situational circular schematic illustrations associated to the different blocks forming the example methods. A surface marking robot should be understood as a self-propelled apparatus to apply a printing material on a surface. In some examples, the surface marking robot comprises a motor, for example an electric motor, and a source of energy such as a battery. The surface marking robot may be propelled by friction, for example by a movement of wheels on the surface, or may be air-lifted. The surface may be a flat surface or a three dimensional surface. The surface may for example be a concrete, a wooden or a composite material surface. The surface may be smooth or may be rough. The surface may comprise holes or protrusions. In some examples, the surface marking robot is operated by a computing device. Computing devices comprise a processor, a memory, and a networking module.

A surface marking robot according to this disclosure is guided using a remote guiding system 120. Such guiding system is remote in that it is remote from, or external to, the surface marking robot. The guiding system permits guiding the surface marking robot from a reference point corresponding to the location of the guiding system. While the guiding system may be displaced, for example by an operator, a guiding system should be understood as remaining static as a given marking or printing operation session takes place. The guiding system may communicate with the surface marking robot using electromagnetic waves or radiation. Example electromagnetic waves include radio waves, visible light or infrared radiation, for example. Example data which may be communicated by the guiding system to the surface marking robot is guiding system position information, permitting that a computing device of the surface marking robot precisely locate the guiding system as reference point, using such reference point as a beacon to determine or estimate an absolute position of the surface marking robot, or permitting that a computing device of the surface marking robot directly obtain an estimate of an absolute position of the surface marking robot from the guiding system. The position information obtained from the guiding system is thereby to be understood as position from the guiding system itself (from which a computing device of the surface marking robot may deduce the position of the surface marking robot), position from the surface marking robot, or even position from another reference point from which the position of the surface marking robot may be deduced. Example data which may be communicated by the guiding system to the surface marking robot is guiding system position information comprising a position of the surface marking robot, the guiding system thereby directly determining, at a computing device of the guiding system, the absolute position of the surface marking robot, and communicating such position to the surface marking robot as guiding system position information. In some examples, guiding system position information comprises angle and distance information. Example guiding systems comprise a Wi-Fi access point, an ultrasound beacon, a total station, a laser tracker or an interferometer. In some examples, the guiding system is an optical guiding system, the communication between the guiding system and the surface marking robot taking place for example through visible or infrared light. The absolute position of the surface marking robot may be estimated based on guiding system position information providing the absolute position of the guiding system, and on a relative position of the surface marking robot relative to the position of the guiding system. In some examples, the guiding system comprises a Global Navigation Satellite System (GNSS) receiver providing an absolute position of the guiding system. In some examples, an absolute position of the guiding system is provided by free stationing, by line of sight observation, from the guiding system, over two or more points having a known location, or by placing the guiding system over a point having a known location. The absolute position of the guiding system may be comprised in the guiding system position information according to this disclosure.

As illustrated in block 101, example method 100 comprises receiving, at a computing device, a first digital representation of a floor plan to be printed by a surface marking robot guided using a remote guiding system, the first digital representation comprising a plurality of floor plan features such as example features 131 and 132. In some examples, the receiving takes place at a network or communication module of a computing device operating the surface marking robot, such receiving originating from another networked computing device. In some examples, the receiving takes place at a port of a computing device operating the surface marking robot, such port being connected to a computer readable medium. A digital representation of a floor plan should be understood as a digital data file comprising digital data associated to a floor plan. The digital representation may be in a form of higher level information, or in the form of lower level information. Higher level information should be understood by information more susceptible to be understood by a human, for example comprising objects. Lower level information should be understood by information more susceptible to be handled for example by firing electronics of nozzles of a printhead. The digital representation may correspond to a specific stage of a printing pipeline. A printing pipeline may for example start with an input file, or raw input file, i.e. a digital representation of a drawing provided by a user, for example in a DXF (Drawing Exchange Format), DWG (DraWinG) or BIM (Building Information Modeling) format. The input file may, in the printing pipeline, be processed to be parsed in layers, for example for checking that relevant printing information is contained in the file. The raw input file, or the input file parsed by layers, may be processed to detect obstacles which would be tangible and present on the surface to be marked and may impact a trajectory or path to be followed by the robot. The raw input file, layer parsed file or file analyzed for obstacles may be processed to sort and group clusters of graphical representations such as lines or text for example. The raw input file, layer parsed file, file analyzed for obstacles, or sorted and grouped file may be processed for path planning, for example in order to sort an order in which graphical representation elements such as floor plan features may be printed, while avoiding obstacles and reducing a printing time. The raw input file, layer parsed file, file analyzed for obstacles, sorted and grouped file or file processed for path planning may be processed for printing or marking, for example to be processed by a state machine of a controller of a print apparatus of the surface marking robot. The digital representation of a floor plan may correspond to any of such example files as well as other example files which may be used in a printing pipeline. In some examples, the first digital representation is a sorted and grouped file.

A floor plan should be understood as a two dimensional or three dimensional representation of a structure such as, for example, a building, such representation comprising for example different rooms, spaces or other physical features of such building. In some examples, the floor plan is at a one to one scale. In some examples, the floor plan comprises floor plan features, floor plan features corresponding to objects or characteristics included in the floor plan such as walls, windows, doors, staircases, elevator cases, sinks, types of finish, construction methods, materials, symbols for electrical, gas, or water supply features, etc. In some examples, the floor plan comprises floor plan features corresponding to traffic, parking or road surface marking, aimed at pedestrians or vehicles.

As illustrated in block 101, example method 100 further comprises receiving, at the computing device, first guiding system position information. The first guiding system position information should be understood as comprising data permitting inferring a position of the guiding system. The first guiding system position information may for example comprise the present absolute position of the guiding system, for example as a set of coordinates. Alternatively, the first guiding system position information may for example comprise a code, the code corresponding to a specific position which may be provided in a list or table as corresponding to the code. The first guiding system position information may further comprise data relative to a relative positioning between the guiding system and the surface marking robot. Such relative positioning may alternatively be available at a surface marking robot computing device instead of being obtained from the guiding system. In some examples, the receiving takes place at a network or communication module of a computing device operating the surface marking robot, such receiving coming from another networked computing device. In some cases, such other networked computing device is a computing device of the guiding device. In some examples, the receiving takes place at a port of a computing device operating the surface marking robot, such port being connected to a computer readable medium.

As illustrated in block 101, example method 100 further comprises receiving, at the computing device, floor plan obstacle information identifying at least a first obstacle 140. In some examples, such floor plan obstacle information is comprised in the receiving of the first digital representation. In some examples, the receiving takes place at a network or communication module of a computing device operating the surface marking robot, such receiving coming from another networked computing device. In some examples, the receiving takes place at a port of a computing device operating the surface marking robot, such port being connected to a computer readable medium. An obstacle should be understood as an obstacle to the transmission of electromagnetic waves. Example obstacles comprise walls, columns or staircases. Obstacles may comprise opaque material preventing transmission of optical electromagnetic waves. Obstacles may comprise conductive material interfering with the transmission of radio electromagnetic waves. In some examples, the first obstacle has a height above a predetermined height threshold. Using such a predetermined threshold may permit selecting obstacles more likely to generate interferences than others. In some examples, the predetermined height threshold is of more than 30 cm, of more than 50 cm, or of more than 70 cm, measured from a base level of the floor plan on which the surface marking robot evolves.

As illustrated in block 102, example method 100 comprises identifying a specific floor plan feature, in this example features 132, of the plurality of floor plan features, the specific floor plan feature intersecting at least partially a shadow region 150 of the first obstacle from a guiding system point of view. The shadow region according to this disclosure should be understood as a region in which communication between the guiding system and the surface marking robot is prevented or distorted by the first obstacle. In some examples, the first obstacle is an opaque obstacle preventing transmission of optical data from the guiding system beyond the obstacle from the guiding system point of view. In some examples, the first obstacle is an obstacle comprising conductive material impacting transmission of radio waves between the guiding system and the surface marking robot. In some examples, the shadow region is formed by the locations where line of sight with the guiding system is prevented by the first obstacle. In some examples, the shadow region is generated, by the computing device, using ray casting, the ray casting enveloping obstacles. The intersection between the specific floor plan feature and the shadow region may be partial or complete. In some examples, the intersection is complete, whereby the specific floor plan feature is completely comprised within the shadow region, the location corresponding to the specific floor plan feature being for example entirely invisible from the guiding system point of view, hidden from the guiding system by the first obstacle. In some examples, the intersection is partial, whereby at least some part of the specific floor plan feature is outside of the shadow region. In any case, printing of such specific floor plan feature by the surface marking robot as the surface marking robot is guided by the guiding system may be distorted or omitted due to the interference in communications between the guiding system and the surface marking robot in the shadow region.

As illustrated in block 103, example method 100 comprises, in response to identifying the specific floor plan feature 132, modifying, by the computing device, the first digital representation to produce a second digital representation, whereby the specific floor plan feature is either deleted or modified, in this specific example, it is modified into modified feature 133, in the second digital representation, the modified floor plan feature 133 excluding at least a portion of the specific floor plan feature, the portion being in the shadow region. In some examples, a choice between deletion, modification, or degree of modification of the specific floor plan feature is proposed to an operator prior to proceeding with marking.

Figure 4:
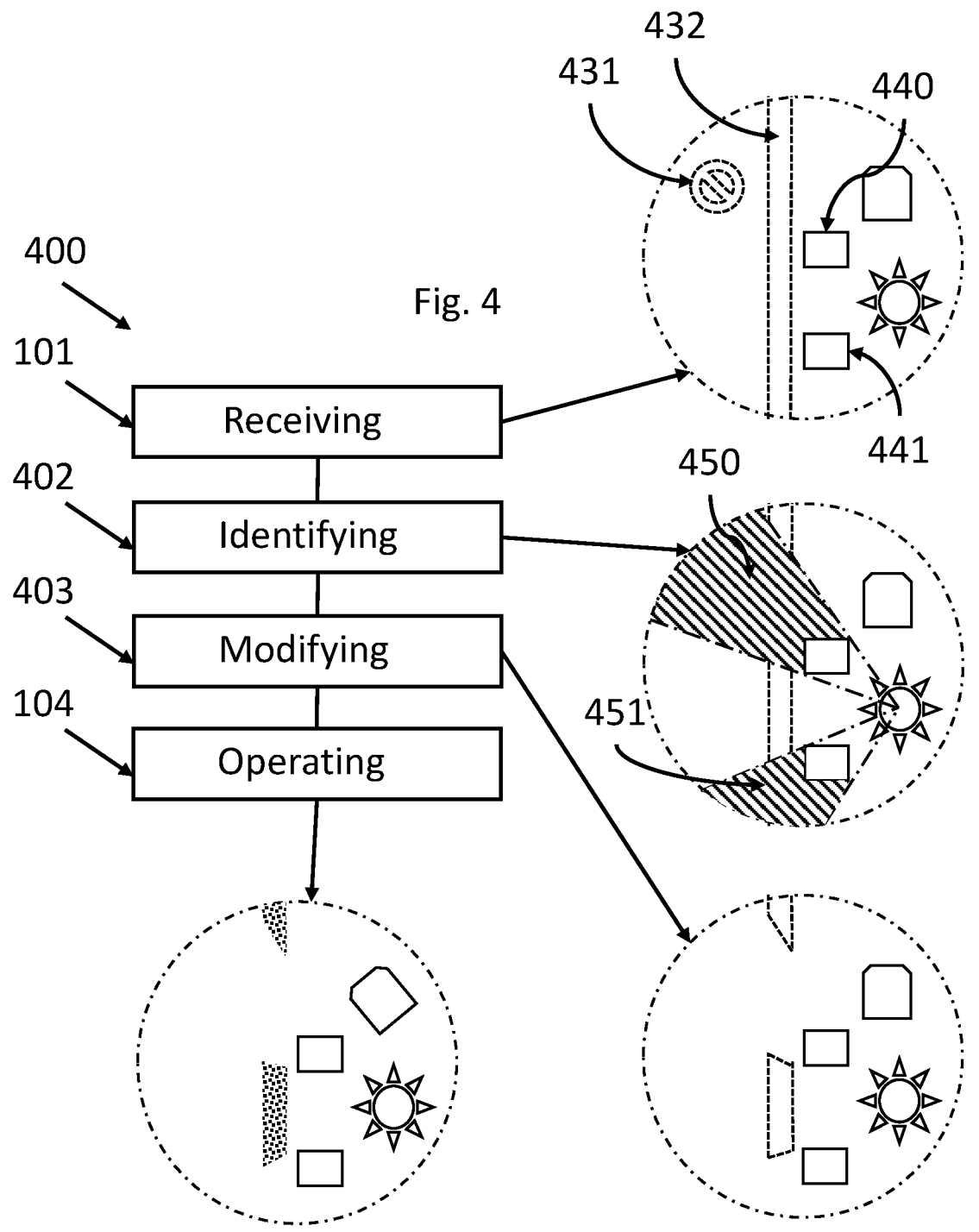
FIG. 4 shows a schematic flow chart of a further example method.

In some examples, the specific floor plan feature is entirely comprised in the shadow region, the specific floor plan feature being deleted in the second digital representation. Such an example is illustrated in FIG. 4, the deleted feature being feature 431.

In some examples, the specific floor plan feature is partially comprised in the shadow region, whereby the specific floor plan feature is not deleted but modified in the second digital representation, as is the case for feature 132 in FIG. 1.

In some examples whereby the specific floor plan feature is partially comprised in the shadow region, and whereby the specific floor plan feature is modified in the second digital representation, the excluded portion is entirely comprised in the shadow region. This permits limiting an extend of the excluded portion, limiting modifications to an intended first digital representation. In some examples, the modified specific floor plan feature comprises a maintained portion located in the shadow region and adjacent to the excluded portion, permitting tuning a degree of modification of the specific floor plan feature. Including in the modified specific floor plan feature such a maintained portion located in the shadow region permits further limiting an extend of the excluded portion, further limiting modifications to an intended first digital representation. In some examples, a surface marking robot may indeed operate reliably in part of the shadow region, for example in an area of the shadow region adjacent to an external perimeter or margin of the shadow region, permitting reliable printing of such a maintained portion, such reliable operation in part of the shadow region relying for example on surface marking robot sensors and Kalman filter based operation. Such liable operation in part of the shadow region may in some examples take place up to 1 m, up to 70 cm, up to 50 cm or up to 40 cm distance from a limit of the shadow region and into the shadow region.

As illustrated in block 104, example method 100 comprises operating, by the computing device, the surface marking robot to print the second digital representation using the guiding system. This permits printing while avoiding interferences due to the first obstacle. In some examples, printing such second digital representation instead of printing the first digital representation may be sufficient, for example if the nature or proportion of the excluded portion does not impact the objective pursued by printing the specific floor plan feature in its entirety, for example when the specific floor plan feature is a line representing a wall or a border of a parking space, whereby the excluded portion is reduced compared to the complete extend of the specific floor plan feature which can thereby be extrapolated by a human, the human extracting meaning from such printed modified specific floor plan feature. In some examples, a human may complete the marking by extrapolation without using the robot. It should be understood that at least some floor plan features or modified floor plan features of the plurality get printed during the operating as per block 104. In this figure and in other figures in this disclosure, floor plan features are illustrated using dashed line defining their perimeter when corresponding to digital versions of such features (such as features 131, 132 or 133), and illustrated using dots when marked or printed (as represented in the circular illustration linked to block 104 of FIG. 1).

Figure 2:
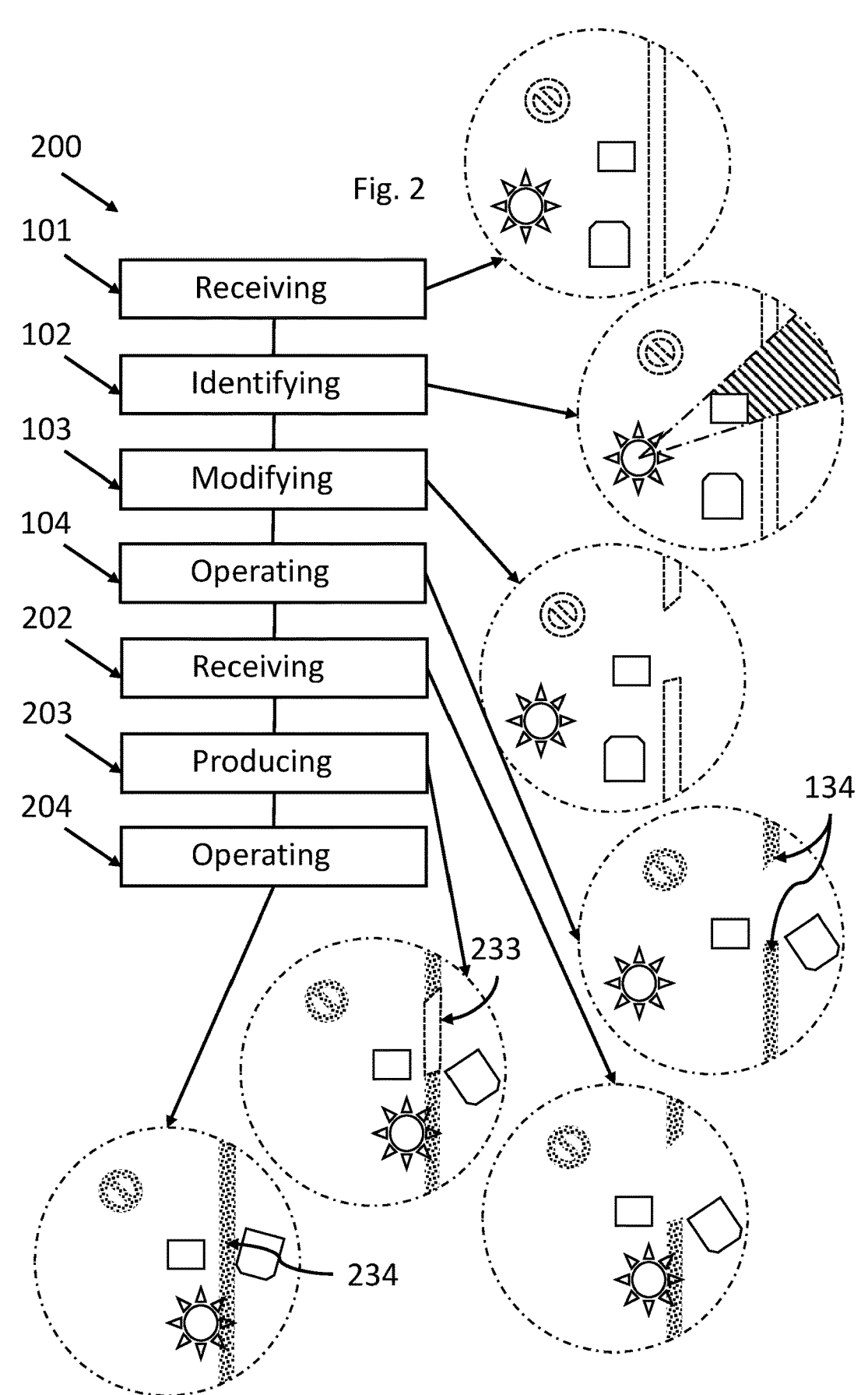
FIG. 2 shows a schematic flow chart of another example method.

As illustrated in example method 200 of FIG. 2, comprising blocks 101-104 as described in the context of method 100, an example method may further comprise receiving, as illustrated in block 202, at the computing device, second guiding system position information differing from the first guiding system position information. Such second guiding system position information should be understood as reflecting a change of location of the guiding system from a first guiding system position to a second guiding system position different from the first, such displacement being represented by the change of position of the guiding system in the circular illustrations linked to blocks 104 and 202. Such a displacement and change in guiding system position information leads to a change in shadow region. In some examples, block 202 follows block 104, whereby the guiding system is displaced to the second guiding system position following the printing according to block 104 leading for example to printing the modified specific floor plan feature 133 to obtain the corresponding printed modified specific floor plan feature 134 as a result from block 104 and prior to block 202. Reference numerals used in the circular schematic illustration in FIG. 1 are not repeated in other figures in order to increase readability.

As illustrated in block 203, method 200 comprises, in response to receiving the second guiding system position, producing a third digital representation, whereby the specific floor plan feature is at least partially completed, in this case as illustrated by portion 233, in the third digital representation compared to the second digital representation. Such completion of a specific floor plan feature may be complete or partial, for example depending on the change in shadow regions corresponding to, on one hand, the first guiding system position, and, on the other hand, the second guiding position.

As illustrated in block 204, method 200 comprises operating the surface marking robot to print the third digital representation using the guiding system in the second guiding system position to at least partially complete the printing of the second digital representation. In some examples, a print resulting from the combination of the second and third digital representations (for example leading to printing both modified features 133 and 233) corresponds to a combined print (for example printed feature 234) which completes to the unmodified specific floor plan feature of the first digital representation. In other examples, further additional iterations of blocks 202, 203 and 204 permit creating subsequent digital representations linked to further different guiding system positions, leading to finalizing the first digital representation as intended, or leading to increasing similarity of a resulting print with the first digital representation. Such iterations may for example take place when further obstacles exist, for example a plurality of structural pillars. In some examples, the third or subsequent digital representation exclude areas previously included in the second digital representation and previously printed by the surface marking robot, in order to limit the use of printing fluid, printing time and energy.

In some examples, any of the methods hereby described may further comprise storing, by the computing device, data corresponding to the excluded portion in a complementing digital representation for later marking. This is particularly useful in the case of example method 200, whereby such stored data may be directly used to produce the third or subsequent digital representations, accelerating the completion of a printing operation in line with the first digital representation.

In some examples, any of the methods hereby described may further comprise sending or displaying, by the computing device, a recommendation to displace the guiding system. Such recommendation may permit completing the first digital representation while limiting a number of guiding system displacements and limiting the printing of a number of respective subsequent digital representations. In some examples, the recommendation is to displace the guiding system in a previously identified shadow region. For example in the context of example method 200, the recommendation may be provided after completing block 104 and before starting block 202, whereby the recommendation to displace the guiding system is a recommendation to displace the guiding system from the first guiding system position to the second guiding system position. In some examples, such a recommendation leads to providing line of sight between the guiding system and the surface marking robot in an area previously corresponding to the excluded portion.

In some examples, any of the methods hereby described, whereby the specific floor plan feature is partially comprised in the shadow region, whereby the specific floor plan feature is modified in the second digital representation, and whereby the excluded portion represents more than a specific threshold of a complete marking surface of the specific floor plan feature, a method may further comprise sending or displaying, by the computing device, a recommendation to displace the guiding system. In some examples, the excluded portion represents more than a specific threshold of 5%, 10% or 25% of the surface of a complete marking surface of the specific floor plan feature. While using a lower threshold avoids loss of information, a higher threshold permits gaining productivity in the marking operation, relying on interpolation from a human interpreting an incomplete marking. In some examples, a nature of the excluded portion may be taken into account in addition to or in combination with the specific threshold in order to provide a recommendation. A guiding system displacement recommendation may for example be sent or displayed in cases of the excluded portion having a nature of an extremity of the specific floor plan feature, or having a nature of a feature characteristic indication (for example, the excluded portion indicates the length or thickness of a wall or window to be built). In some examples, a guiding system displacement recommendation may for example be sent or displayed prior to block 103 and following block 102, for example in order to provide an alternative first guiding system placement reducing a size or changing the nature of the excluded portion prior to the marking.

In some examples, any of the methods hereby described may further comprise the computing device sending or displaying a proposed guiding system position differing from the first guiding system position, the proposed guiding system position providing direct line of sight between the guiding system and the surface marking robot when the robot is at a location corresponding to the excluded portion associated with the first guiding system position. This can permit completing the marking of the specific floor plan features.

Figure 3:
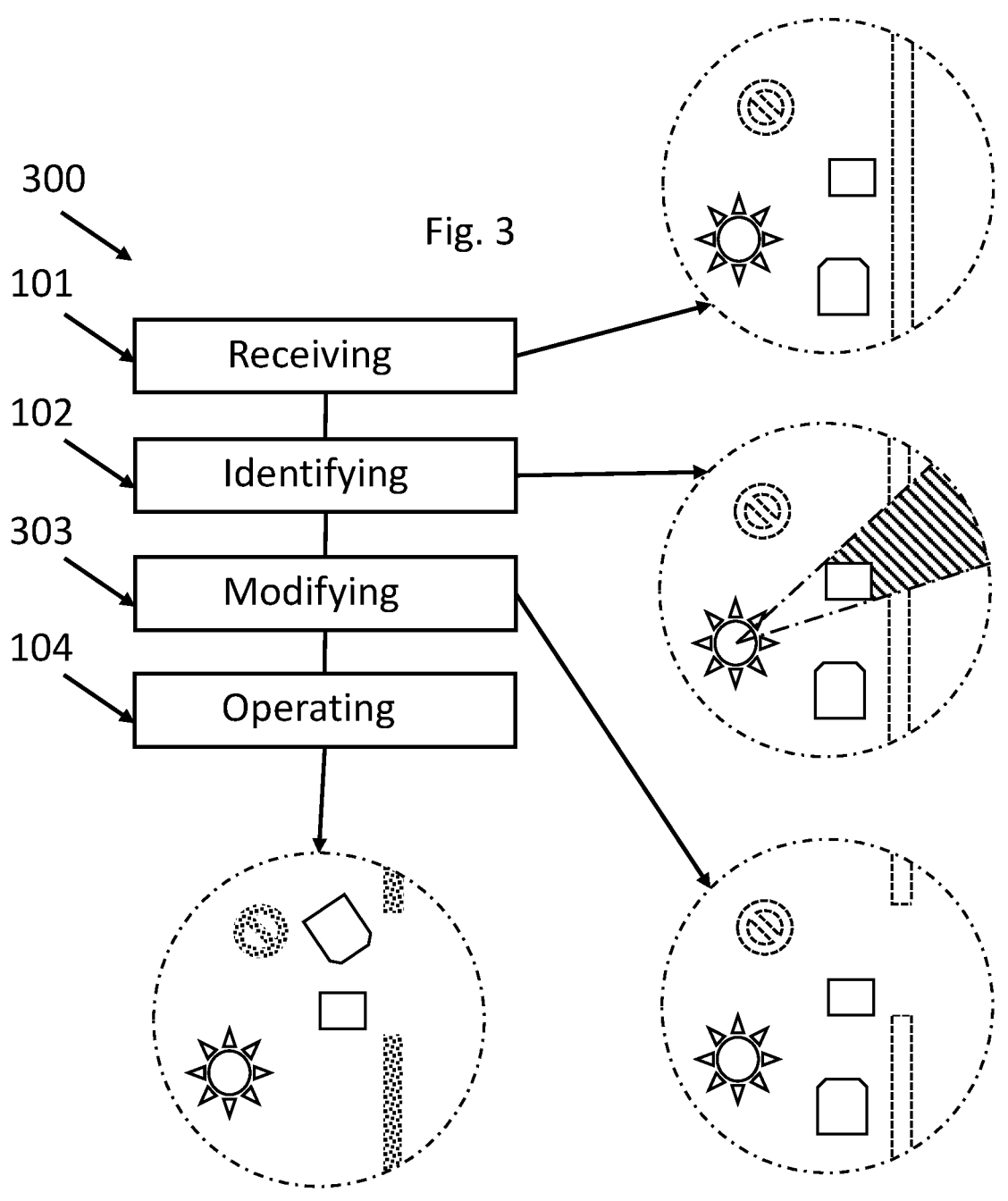
FIG. 3 shows a schematic flow chart of yet another example method.

As illustrated in example method 300 of FIG. 3, comprising blocks 101-102 and 104 as described in the context of method 100, method 300 comprises block 303 of, in response to identifying the specific floor plan feature as per block 102, modifying, by the computing device, the first digital representation to produce a second digital representation, whereby the specific floor plan feature is partially comprised in the shadow region, whereby the specific floor plan feature is modified in the second digital representation, the modified floor plan feature excluding at least a portion of the specific floor plan feature, the portion being in the shadow region, and whereby the modified floor plan feature excludes a further portion of the specific floor plan feature, the further portion being adjacent to the shadow region. Excluding such a further portion in addition to the portion being in the shadow region permits limiting or suppressing operation of the robot in areas in the vicinity of the shadow region in addition to limiting or suppressing operation in the shadow region itself. Excluding such a further portion in addition to the portion being in the shadow region can improve or facilitate the maneuvering of the surface marking robot around obstacles.

As illustrated in example method 400 of FIG. 4, comprising blocks 101 and 104 as described in the context of method 100, and whereby the floor plan obstacle information identifies one or more further obstacles 440 and 441, method 400 comprises block 402 of identifying, by the computing device, a specific floor plan feature 431 of the plurality of floor plan features intersecting at least partially a shadow region 450 of the first obstacle 440 from a guiding system point of view, and of identifying, by the computing device, one or more further floor plan features 432 of the plurality of floor plan features intersecting at least partially one or more further shadow regions 451 of the one or more further obstacles from the guiding system point of view. This permits taking several obstacles and respective shadow regions into account. In some examples, the one or more further floor plan features comprise the specific floor plan feature. In some examples, the one or more further obstacles comprise one or more structural pillars.

Example method 400 further comprises, in block 403, in response to identifying the specific floor plan feature as per block 402, modifying, by the computing device, the first digital representation to produce a second digital representation, whereby the specific floor plan feature is either deleted, in the case of feature 431, or modified, in the case of feature 432, in the second digital representation, the modified floor plan feature excluding at least a portion of the specific floor plan feature, the portion being in the shadow region 450. Block 403 further comprises, in response to identifying the one or more further specific floor plan features as per block 402, modifying, by the computing device, the first digital representation to produce the second digital representation, whereby the one or more further specific floor plan features are, respectively, either deleted or modified, further modified in the case of feature 432, in the second digital representation, the respectively modified floor plan features excluding at least respective portions of the respective one or more further specific floor plan features, the respective portions being in the respective shadow regions. It should be noted that in some examples, the extend of modifications or deletion of floor plan features is such that iterations involving different guiding system positions may be particularly suited. An example method may thereby combine blocks 101, 402, 403, 104 as well as blocks 202, 203 and 204.

In some examples, any of the methods hereby described may further comprise calculating, by the computing device, an impact parameter, the impact parameter taking into account one or more of the following factors:

a surface proportion of the specific floor plan feature located in the shadow region;

a shape of the specific floor plan feature; and an orientation of the specific floor plan feature;

the method comprising the computing device either providing a recommendation to displace the guiding system and iterate printing using the displaced guiding system or providing a recommendation not to iterate printing, in function of the impact parameter. In some examples, the calculating of the impact parameter may involve machine learning, for example based on computational models and algorithms for classification, clustering, regression and dimensionality reduction, such as neural networks, genetic algorithms, support vector machines, k-means, kernel regression and discriminant analysis, in particular based on training data. In such cases, the use of machine learning may permit reducing a number of guiding system displacements while reaching an appropriate and sufficient level of reproduction of the first digital representation. In some examples, a reduction of the surface proportion of the specific floor plan feature located in the shadow region may reduce the impact parameter and lead towards a recommendation not to iterate printing. In some examples of a specific floor plan feature having an elongated, regular shape (for example representing a wall, or a border of a parking place), such a shape may be considered to reduce the impact parameter and lead towards a recommendation not to iterate printing due to a high likelihood that the overall shape of the specific floor plan features may be interpolated by a person decoding the marked and modified specific floor plan feature. In some examples, the fact that a specific floor plan feature may be oriented in line with a ray casted by the guiding system and in a shadow region may lead to an increase of the impact parameter and lead towards a recommendation to displace the guiding system and iterate printing using the displaced guiding system.

Figure 5:
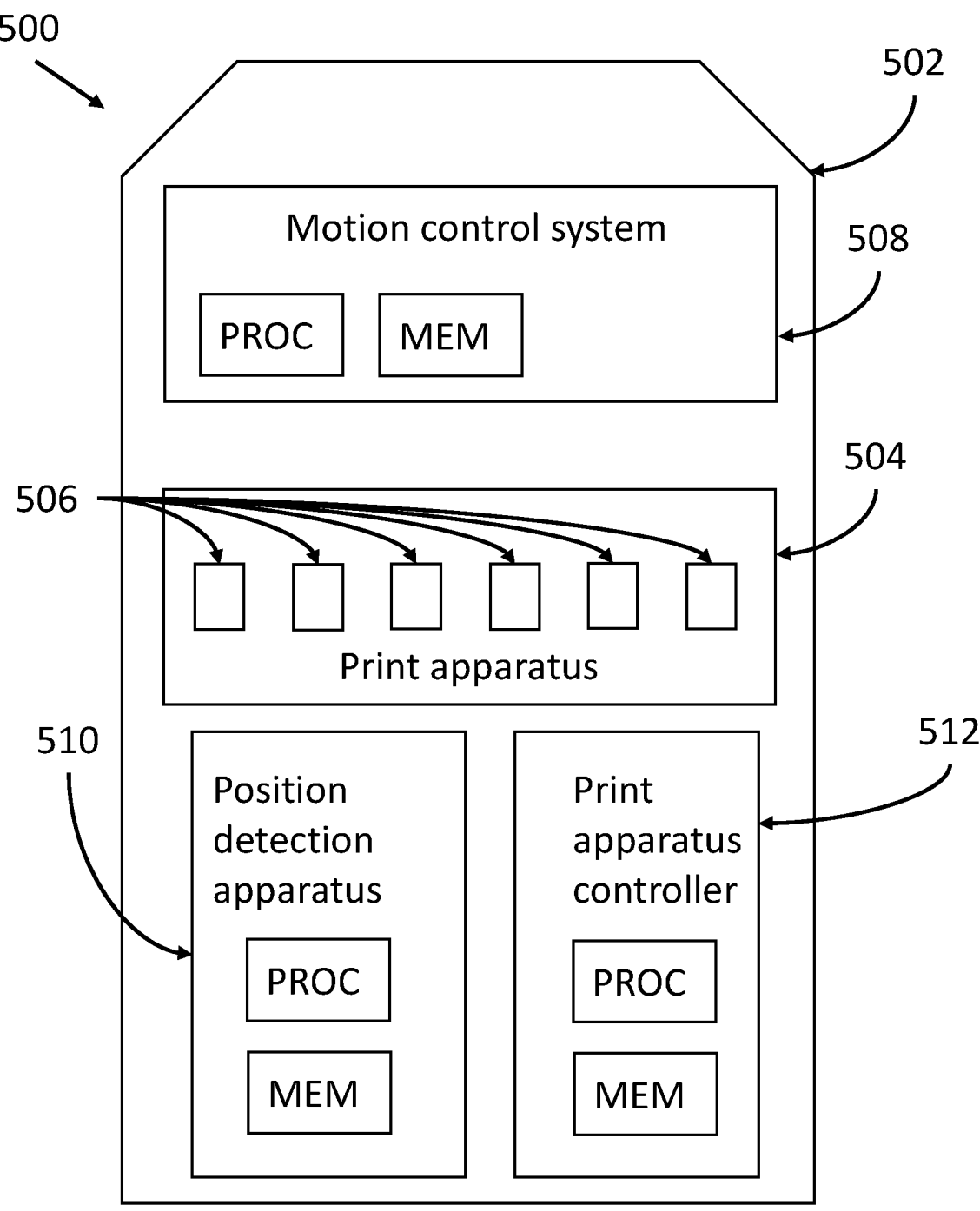
FIG. 5 shows a schematic representation of an example surface marking robot.

FIG. 5 shows a surface marking robot 500 comprising a body 502 and a print apparatus 504 comprising a plurality of print nozzles 506 mounted on the body 502. The robot 500 also includes a motion control system 508, to cause the robot 500 to travel along the surface with an intended path. In some examples, the motion control system 508 may comprise a plurality of wheels connected with a motor, or any suitable propulsion system. In some examples, the motion control system 508 may also comprise a processor to receive and execute instructions defining an intended path or trajectory for the robot 500 to follow. In some examples the motion control system 508 may comprise a machine readable medium or memory having stored instructions defining a predefined intended path for the robot 500 to follow. In other examples the motion control system 508 may define an intended path for the robot 500. In some examples, the motion control system 508 may comprise control circuitry to control wheels, a motor or other propulsion apparatus mounted on the body 502 of the robot 500 to control a direction (and in some examples, speed) of the robot 500. In some examples, the motion control system may be a microcontroller following a trajectory servo in communication with a propulsion system comprising motor driver electronics to supply force to a set of wheels.

The robot 500 also includes a position detection apparatus 510 for detecting a position of the robot 500 based on a guiding system signal, such signal comprising for example guiding system position information. The position detection apparatus 510 may for example, comprise a sensor, or, in some examples, a plurality of sensors. The sensor(s) may be any kind of suitable position sensor such as rotary encoders located on wheels of the robot, a camera located on the body of the robot, a Light Detection and Ranging (LIDAR) system, an inertial mechanical unit to sense accelerations and direction of the robot, a combination including at least some of the previously-mentioned position sensors or any other suitable kind of position sensor. In some examples, information from the sensor(s) may be compared with a servo path to detect deviations. For example, accelerations in an axis other than that defined by the servo path can indicate that the robot is not following the defined servo path. In some examples a determination that rotary encoders on the robot's wheels are not increasing steadily can provide an indication that the robot has deviated from the defined path. The position detection apparatus 510 may comprise processing circuitry to determine whether a determined position matches an intended path of the robot 500, which may be held by the motion control apparatus 508. In some examples, the position detection apparatus 510 and/or the motion control apparatus 508 may determine a magnitude and direction of the difference between the robot's current position and its intended path and may correct the path of the robot accordingly. In some examples the functioning of the position detection apparatus is impaired when the surface marking robot is located in a shadow region, an obstacle being located between the surface marking robot and the guiding system, impacting line of sight between the surface marking robot and the guiding system.

In use of the robot 500, the print apparatus 504 deposits printing material onto the surface, for example from a nozzle of the plurality of nozzles 506, for example to form a line, as the robot 500 follows an intended path. In some examples, upon detection by the position detection apparatus that the position of the robot 500 has deviated from the intended path, the motion control system 508 can in some examples perform a correction to a direction of travel of the robot 500 such that the robot 500 returns to the intended path.

The robot 500 also includes a controller 512 of the print apparatus. In some examples, the controller 512 comprises a processor. In some examples, the processor of the controller 512 is used as a single processor of the surface marking robot, being a processor for the motion control system and for the position detection apparatus also. In some examples, more than one processors are used in the surface marking robot. In the example illustrated in FIG. 5, each of the motion control system, position detection apparatus and print apparatus controller have their own processor, and an own memory or non-transitory machine-readable storage medium.

Upon reception, by the controller 512 of the print apparatus, of a first digital representation of a floor plan comprising a plurality of floor plan features, and of information identifying at least an obstacle, for example as illustrated in any of the example methods hereby described, the controller is to select a specific floor plan feature of the plurality of floor plan features, the specific floor plan feature being at least partially located out of sight from the guiding system.

As illustrated for example in any of the methods hereby described, the controller of the print apparatus is to, in response to selecting the specific floor plan feature, adapt the first digital representation to generate a second digital representation, whereby the specific floor plan feature is either removed or modified in the second digital representation, the modified floor plan feature excluding at least a portion of the specific floor plan feature, the portion being out of sight from the guiding system.

Figure 6:
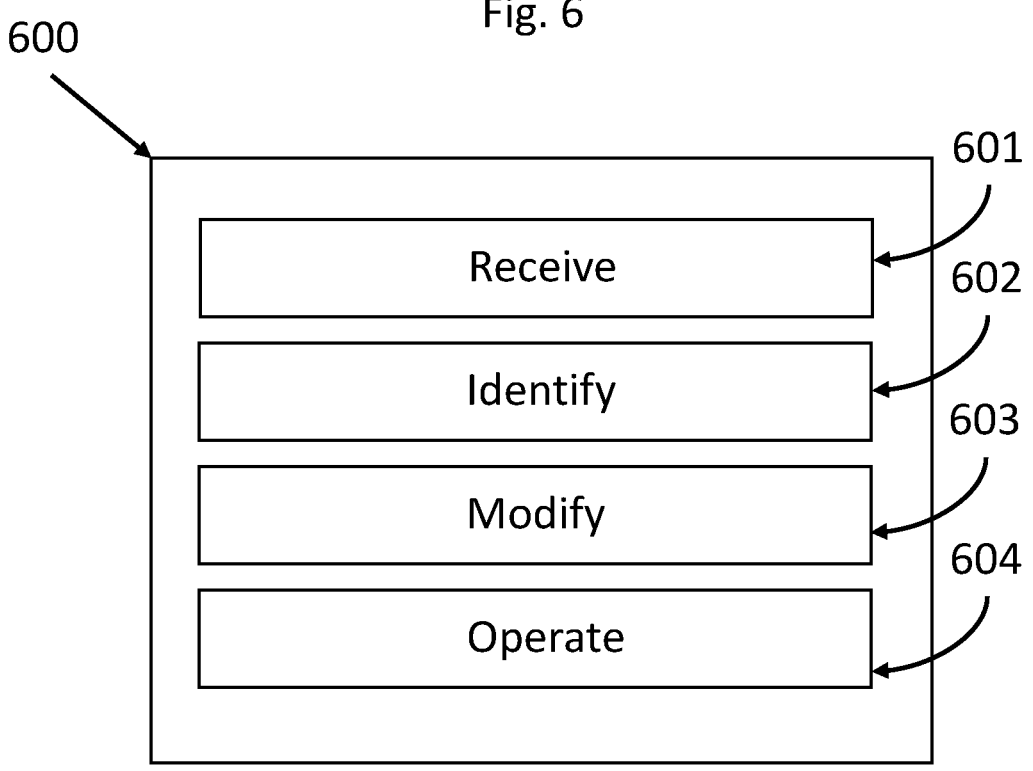
FIG. 6 shows a schematic representation of an example machine readable medium.

FIG. 6 shows a schematic representation of an example tangible machine readable medium 600. Such medium 600 may for example correspond to the block "MEM" of the print apparatus controller 512 of FIG. 5. In other examples, medium 600 may be remote from and external to the surface marking robot and be in communication with the robot using a wireless communication system or module such as Wi-Fi, Bluetooth, or any suitable communication system or module.

Medium 600 is encoded with instructions executable by a processor of a controller of a print apparatus of a surface marking robot operated in reference to a guiding system separate from the surface marking robot and comprises instructions 601 according to any of the methods hereby described to receive:

a first digital representation of a floor plan to be printed by the surface marking robot, the first digital representation comprising a plurality of floor plan features; guiding system position information; and
floor plan obstacle information identifying at least a first obstacle.

Medium 600 further comprises instructions 602 to identify a specific floor plan feature of the plurality of floor plan features, whereby the first obstacle is at least partially situated between the guiding system and the specific floor plan feature. The identification may function in different manners, for example in function of a format of the digital data file. In some examples, the digital data file comprises objects corresponding to floor plan features or obstacles, each object comprising characteristics defining their nature, such characteristics facilitating the processing, such characteristics comprising for example a shape characteristic (line or circle, for example), a dimension characteristic (width, length, height or surface area for example) or a function characteristic (wall, pillar or door for example). In other examples, the digital data file may comprise a bit map, the processing involving detecting shapes such as lines or circles in the bit map. The identification may involve classifying features or obstacles for example in function of their shape (for example length or width) or, in the case of features, area fill (for example quantity of filled area compared to outlines). In some examples, the plurality of floor plan features are classified according to floor plan feature classes, such classes permitting for example to identify a function or nature of the floor plan feature concerned. In some example, such classes are provided in the digital data file provided as an input file, for example in the case of processing a BIM input file as digital data file or representation. In some examples, the floor plan feature classes comprise a wall class, the specific floor plan feature pertaining to the wall class, the specific floor plan feature comprising hosted wall elements, the specific floor plan feature comprising information related to the hosted wall elements, and information such as the wall thickness information, thereby facilitating, for example, identifying an excluded portion as having a nature of a feature characteristic indication and permitting determining, in some examples, either providing a recommendation to displace the guiding system and iterate printing using the displaced guiding system or providing a recommendation not to iterate printing, for example in function of an impact parameter. In some examples, the digital representation is a specific layer of a three dimensional representation of the floor plan, such digital data file being extracted from another data file corresponding to the three dimensional representation of the floor plan.

Medium 600 further comprises instructions 603 to modify the first digital representation to produce a second digital representation, whereby the specific floor plan feature is either deleted or modified in the second digital representation, the modified floor plan feature excluding at least a portion of the specific floor plan feature, whereby the first obstacle is at least partially situated between the guiding system and the excluded portion.

Medium 600 further comprises instructions 604 to operate the surface marking robot to print the second digital representation instead of the first digital representation.

The present disclosure is described with reference to flow charts. Although the flow charts described above show a specific order of execution, the order of execution may differ from that which is depicted. Blocks described in relation to one flow chart may be combined with those of another flow chart.

It shall be understood that some blocks in the flow charts can be realized using machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode. Further, some teachings herein may be implemented in the form of a computer software product, the computer software product being stored in a storage medium and comprising a plurality of instructions for making a computer device implement the methods recited in the examples of the present disclosure.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A method comprising:

receiving, at a computing device:

a first digital representation of a floor plan to be printed by a surface marking robot guided using a remote guiding system, the first digital representation comprising a plurality of floor plan features;

first guiding system position information; and floor plan obstacle information identifying at least a first obstacle;

identifying, by the computing device, a specific floor plan feature of the plurality of floor plan features intersecting at least partially a shadow region of the first obstacle from a guiding system point of view;

in response to identifying the specific floor plan feature, modifying, by the computing device, the first digital representation to produce a second digital representation, wherein the specific floor plan feature is either deleted or modified in the second digital representation, the modified floor plan feature excluding at least a portion of the specific floor plan feature, the portion being in the shadow region;

operating, by the computing device, the surface marking robot to print the second digital representation using the guiding system;

receiving, at the computing device, second guiding system position information differing from the first guiding system position information;

in response to receiving the second guiding system position, producing a third digital representation, wherein the specific floor plan feature is at least partially completed in the third digital representation compared to the second digital representation; and operating the surface marking robot to print the third digital representation using the guiding system in the second guiding system position to at least partially complete the printing of the second digital representation.

2. The method according to claim 1, wherein the third digital representation excludes areas previously included in the second digital representation and previously printed by the surface marking robot.

3. The method according to claim 1, the method further comprising storing, by the computing device, data corresponding to the excluded portion in a complementing digital representation for later marking.

4. The method according to claim 1, further comprising sending or displaying, by the computing device, a recommendation to displace the guiding system.

5. The method according to claim 1, wherein the guiding system is an optical guiding system.

6. The method according to claim 1, wherein the specific floor plan feature is partially comprised in the shadow region, wherein the specific floor plan feature is modified in the second digital representation, and wherein the excluded portion is entirely comprised in the shadow region.

7. The method according to claim 1, wherein the specific floor plan feature is partially comprised in the shadow region, wherein the specific floor plan feature is modified in the second digital representation, and wherein the modified floor plan feature excludes a further portion of the specific floor plan feature, the further portion being adjacent to the shadow region.

8. The method according to claim 1, wherein the specific floor plan feature is partially comprised in the shadow region, wherein the specific floor plan feature is modified in the second digital representation, and wherein the excluded portion represents more than a specific threshold of a complete marking surface of the specific floor plan feature, the method further comprising sending or displaying, by the computing device, a recommendation to displace the guiding system.

9. The method according to claim 1, wherein the floor plan obstacle information identifies one or more further obstacles, the method comprising:

identifying, by the computing device, one or more further floor plan features of the plurality of floor plan features intersecting at least partially one or more further shadow regions of the one or more further obstacles from the guiding system point of view;

in response to identifying the one or more further specific floor plan features, modifying, by the computing device, the first digital representation to produce the second digital representation, wherein the one or more further specific floor plan features are, respectively, either deleted or modified in the second digital representation, the respectively modified floor plan features excluding at least respective portions of the respective one or more further specific floor plan features, the respective portions being in the respective shadow regions.

10. The method according to claim 1, the method further comprising the computing device sending or displaying a proposed guiding system position differing from the first guiding system position, the proposed guiding system position providing direct line of sight between the guiding system and the surface marking robot when the robot is at a location corresponding to the excluded portion associated with the first guiding system position.

11. The method according to claim 1, the first obstacle having a height above a predetermined height threshold.

12. The method according to claim 1, the method further comprising:

calculating, by the computing device, an impact parameter, the impact parameter taking into account one or more of the following factors:

a surface proportion of the specific floor plan feature located in the shadow region;

a shape of the specific floor plan feature; and an orientation of the specific floor plan feature;

the method comprising the computing device either providing a recommendation to displace the guiding system and iterate printing using the displaced guiding system or providing a recommendation not to iterate printing, in function of the impact parameter.

13. A surface marking robot comprising:

a body;

a print apparatus comprising a plurality of print nozzles mounted on the body;

a controller of the print apparatus;

a position detection apparatus to determine a position of the robot based on a guiding system signal; and a motion control system, to cause the robot to travel along the surface with an intended path, wherein the print apparatus is to deposit print material onto the surface as the robot follows the intended path;

wherein, upon reception by the controller of the print apparatus of a first floor plan digital representation comprising a plurality of floor plan features, and of information identifying at least an obstacle, the controller of the print apparatus is to:

select a specific floor plan feature of the plurality of floor plan features, the specific floor plan feature being at least partially located out of sight from the guiding system;

in response to selecting the specific floor plan feature, adapt the first digital representation to generate a second digital representation, wherein the specific floor plan feature is either removed or modified in the second digital representation, the modified floor plan feature excluding at least a portion of the specific floor plan feature, the portion being out of sight from the guiding system;

wherein the controller of the print apparatus calculates an impact parameter, the impact parameter taking into account one or more of the following factors:

a surface proportion of the specific floor plan feature located in the portion being out of sight;

a shape of the specific floor plan feature; and an orientation of the specific floor plan feature;

wherein the controller of the print apparatus either provides a recommendation to displace the guiding system and iterate printing using the displaced guiding system or provides a recommendation not to iterate printing, in function of the impact parameter.

14. A non-transitory machine-readable storage medium encoded with instructions executable by a processor of a controller of a print apparatus of a surface marking robot operated in reference to a guiding system separate from the surface marking robot, the machine-readable storage medium comprising:

instructions to receive:

a first digital representation of a floor plan to be printed by the surface marking robot, the first digital representation comprising a plurality of floor plan features;

guiding system position information; and floor plan obstacle information identifying at least a first obstacle;

instructions to identify a specific floor plan feature of the plurality of floor plan features, wherein the first obstacle is at least partially situated between the guiding system and the specific floor plan feature;

instructions to modify the first digital representation to produce a second digital representation, wherein the specific floor plan feature is either deleted or modified in the second digital representation, the modified floor plan feature excluding at least a portion of the specific floor plan feature, wherein the first obstacle is at least partially situated between the guiding system and the excluded portion;

instructions to operate the surface marking robot to print the second digital representation instead of the first digital representation; and instructions to send or display a recommendation to displace the guiding system, wherein the specific floor plan feature is partially comprised in a shadow region, wherein the specific floor plan feature is modified in the second digital representation, and wherein the excluded portion represents more than a specific threshold of a complete marking surface of the specific floor plan feature.

* * * * *